United States Patent
Gudmundson et al.

(10) Patent No.: US 11,941,031 B2
(45) Date of Patent: Mar. 26, 2024

(54) SYSTEMS AND METHODS FOR SPECIFYING OLAP CUBE AT QUERY TIME

(71) Applicant: Google LLC, Mountain View, CA (US)

(72) Inventors: Stephan Gudmundson, Mountain View, CA (US); Nikhil Teletia, Mountain View, CA (US); Andrew Leeds, Mountain View, CA (US); John Sismanis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/290,543

(22) PCT Filed: Feb. 6, 2019

(86) PCT No.: PCT/US2019/016901
§ 371 (c)(1),
(2) Date: Apr. 30, 2021

(87) PCT Pub. No.: WO2020/149865
PCT Pub. Date: Jul. 23, 2020

(65) Prior Publication Data
US 2022/0012266 A1     Jan. 13, 2022

Related U.S. Application Data
(60) Provisional application No. 62/792,640, filed on Jan. 15, 2019.

(51) Int. Cl.
*G06F 16/28* (2019.01)
*G06F 16/22* (2019.01)
*G06F 16/2455* (2019.01)

(52) U.S. Cl.
CPC ........ *G06F 16/283* (2019.01); *G06F 16/2264* (2019.01); *G06F 16/24552* (2019.01)

(58) Field of Classification Search
CPC ............... G06F 16/283; G06F 16/2264; G06F 16/24552; G06F 16/2452; G06F 16/2465
See application file for complete search history.

(56) References Cited

U.S. PATENT DOCUMENTS 6,633,882 B1 * 10/2003 Fayyad ................ G06F 16/283
8,983,989 B2     3/2015 Srikanth et al.
(Continued)

FOREIGN PATENT DOCUMENTS

| CN | 107301206 | 10/2017 |
|---|---|---|
| CN | 108875008 | 11/2018 |
| CN | 104933115 | 5/2019 |

OTHER PUBLICATIONS

Niemi et al., "Constructing OLAP cubes based on queries", DOLAP '01: Proceedings of the 4th ACM international workshop on Data warehousing and OLAP Nov. 2001, pp. 9-15 https://doi.org/10.1145/512236.512238 (Year: 2001).*

(Continued)

*Primary Examiner* — Mark D Featherstone
*Assistant Examiner* — Kweku William Halm
(74) *Attorney, Agent, or Firm* — Dority & Manning, P.A.

(57) ABSTRACT

Systems, methods, and storage media for generating an online analytical processing cube (MAP) are disclosed. Exemplary implementations may: receive a cube definition file; access a data-source; generate a data-source property configuration for the data-source using the cube definition file to; determine each of respective parsed data from the data-source is a key, attribute, or measure; and generate the OLAP cube by combining the cube definition file and the data-source property configuration for the determined parsed data from the data-source.

20 Claims, 4 Drawing Sheets

(56) References Cited

U.S. PATENT DOCUMENTS

| | | | | |
|---|---|---|---|---|
| 11,176,175 | B1* | 11/2021 | Snyder | G06F 16/283 |
| 2009/0089240 | A1* | 4/2009 | Winter | G06F 16/283 |
| | | | | 707/999.1 |
| 2009/0210430 | A1 | 8/2009 | Averbuch et al. | |
| 2009/0228436 | A1* | 9/2009 | Pasumansky | G06F 16/283 |
| | | | | 707/999.102 |
| 2009/0240663 | A1* | 9/2009 | Plattner | G06F 16/27 |
| 2012/0179644 | A1* | 7/2012 | Miranker | G06F 16/9024 |
| | | | | 707/812 |
| 2014/0074771 | A1* | 3/2014 | He | G06F 16/283 |
| | | | | 707/E17.014 |
| 2016/0103903 | A1* | 4/2016 | Vivalda | H04L 65/403 |
| | | | | 709/204 |
| 2016/0335318 | A1* | 11/2016 | Gerweck | G06F 16/24542 |
| 2016/0378842 | A1* | 12/2016 | Demonsant | G06F 16/275 |
| | | | | 707/602 |
| 2017/0116308 | A1* | 4/2017 | Alberg | G06Q 10/0635 |
| 2017/0193024 | A1* | 7/2017 | Fung | G06F 16/248 |
| 2017/0212725 | A9* | 7/2017 | Li | G06F 16/254 |
| 2019/0332610 | A1* | 10/2019 | Krishna | G06F 16/2457 |
| 2020/0026709 | A1* | 1/2020 | Ramaiyer | G06F 16/2455 |

OTHER PUBLICATIONS

Letrache et al. "The Automatic Creation of OLAP cube using an MDA approach" pp. 1-33 (Year: 2017).*
International Search Report and Written Opinion for PCT Appln. Ser. No. PCT/US2019/016901 dated Sep. 20, 2019 (14 pages).
Machine Translated Chinese Search Report Corresponding to Application No. 201980073362.4 on Jan. 11, 2024.

* cited by examiner

SYSTEMS AND METHODS FOR SPECIFYING OLAP CUBE AT QUERY TIME

CROSS-REFERENCE TO RELATED APPLICATIONS

The present application is a National Stage Application, filed under 35 U.S.C. 371, of International Patent Application No. PCT/US2019/016901 filed on Feb. 6, 2019 titled "SYSTEMS AND METHODS FOR SPECIFYING OLAP CUBE AT QUERY TIME," which in turn claims the benefit and priority of U.S. Patent Application No. 62/792,640 filed Jan. 15, 2019 titled "SYSTEMS AND METHODS FOR SPECIFYING OLAP CUBE AT QUERY TIME," the entireties of which are incorporated by reference herein.

BACKGROUND

This disclosure is related to information distribution. Schemas, including star schemas, can generally be described as relational data warehouses. Cube structures are often built from relational data warehouses in order to provide faster and more powerful analysis of data. In general, cube structures accomplish this by organizing data in a hierarchical arrangement according to dimensions and measures. Dimensions may group the data along natural categories and consist of one or more levels where each level represents a different grouping, within the same dimension. The levels can be organized into one or more hierarchies, typically from a coarse-grained level down to the most detailed. Measures can be the cube data values that are summarized and analyzed.

SUMMARY

One aspect of the present disclosure relates to a system configured for generating an online analytical processing (OLAP) cube. The system may include one or more processors configured by machine-readable instructions. The processor(s) may be configured to receive a cube definition file. The processor(s) may be configured to access and parse data of a data-source. The processor(s) may be configured to generate a data-source property configuration for the data-source. The processor(s) may be configured to determine each of respective parsed data from the data-source is a key, attribute, or measure. The processor(s) may be configured to generate the OLAP cube by combining the cube definition file and the data-source property configuration for the determined parsed data from the data-source.

Another aspect of the present disclosure relates to a method for generating an online analytical processing cube. The method may include receiving a cube definition file. The method may include accessing and parsing data of a data-source. The method may include generating a data-source property configuration for the data-source using the cube definition file. The method may include determining each of respective parsed data from the data-source is a key, attribute, or measure. The method may include generating the OLAP cube by combining the cube definition file and the data-source property configuration for the determined parsed data from the data-source.

Another aspect of the present disclosure relates to a system configured for operating a query system. The system may include one or more processors configured by machine-readable instructions. The processor(s) may be configured to receive a query including a cube identifier. The processor(s) may be configured to retrieve objects from a data source associated with the cube identifier. The processor(s) may be configured to generate an OLAP context container based on the query by determining if a cached OLAP context container associated with the cube identifier is accessible. The processor(s) may be configured to respond to the query based on the generated OLAP context container and retrieved objects from the data source.

Another aspect of the present disclosure relates to a method for operating a query system. The method may include receiving a query including a cube identifier. The method may include retrieving objects from a data source associated with the cube identifier. The method may additionally automatically generate and/or fetch an OLAP context container based on the query by determining if a cached OLAP context container associated with the cube identifier is accessible. In some implementations, the method may automatically generate an OLAP context container based on inferred data-source properties and the role of data-sources required for cube processing. The method may include responding to the query based on the generated OLAP context container and retrieved objects from the data source.

Yet other aspects of the present disclosure relate to a non-transient computer-readable storage medium having instructions embodied thereon, the instructions being executable by one or more processors to perform any of the above methods. Other implementations are disclosed, including implementations directed to systems, methods, apparatuses, computer-readable mediums and user interfaces.

DETAILED DESCRIPTION

Figure 1:
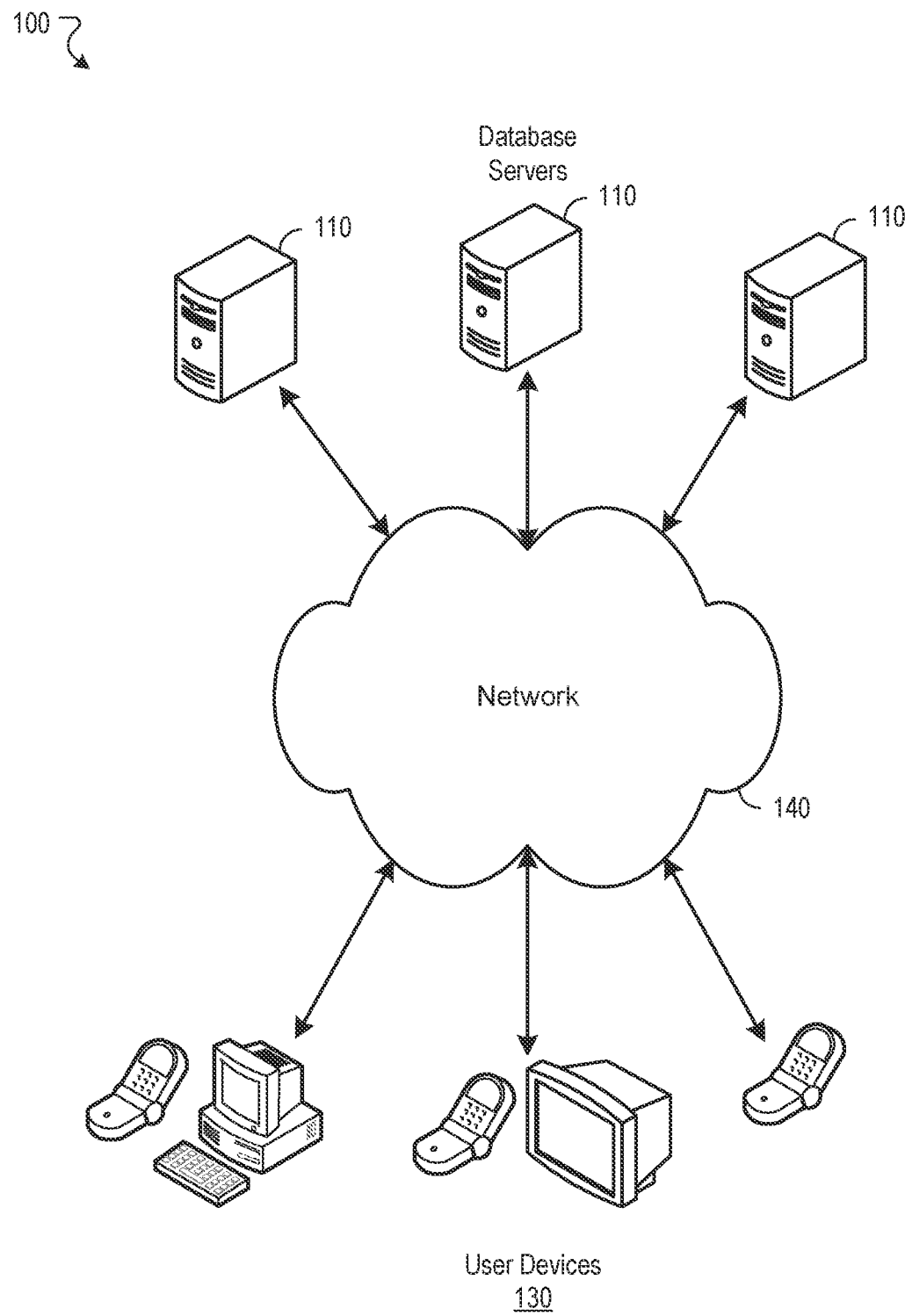
FIG. 1 is a block diagram of an example network architecture for specifying an OLAP cube at query time.

Systems and methods are disclosed for specifying OLAP cubes at a database query time. Additionally, the creation of OLAP cubes over star schema is simplified. The search and discovery of existing OLAP cubes is simplified. Finally, the time is reduced to start querying an OLAP cube after it is defined and updated. These features and advantages are at least partially accomplished by decoupling the schema from the instance. Star schemas can more generally be described as a relational data warehouse designed for speed of retrieval. Cube structures are often built from relational data warehouses in order to provide faster and more powerful analysis of the data. In general, cube structures accomplish this by organizing data in a hierarchical arrangement according to dimensions and measures. Dimensions may group the data along natural categories and consist of one or more levels where each level represents a different grouping within the same dimension. The levels can be organized into one or more hierarchies, typically from a coarse-grained level down to the most detailed. Measures can be the cube data values that are summarized and analyzed.

Some types of OLAP cubes or other cube database structures are a managed service that allows developers to improve queriability of their multidimensional data through cube modeling. It provides data curation, protection against erroneous schema modification, and fast querying. It handles both simple and complex business logic. One technical and computer-centric problem solved is simplifying creation of a cube database which would otherwise require writing multiple schema files. A schema is the structure behind the data organization. It comprises different table relationships enabling the business rules for the underlying mission for which the database is created. Simplification would result in a reduction of time taken to write the schema. Using the single configuration file, (1) the data-source property configuration for each data-source is automatically generated and (2) whether the columns of relational data-sources are key, attribute, or measure are automatically generated. Cube creation may involve a tool which involves human in building the cube definition. The tool can automatically generate configuration and schema (or cube definition) of the OLAP cube and when tool finds anything ambiguous it involves human to remove the ambiguity, asks questions to the end user to generate the cube definition itself.

Another technical and computer-centric problem solved is creation of a mechanism where none exists for discovery of existing and new OLAP cubes. Cubes are indexed so that they can be searched and discovered.

Another technical and computer-centric problem solved is the reduction of time to write a query, from deciding to use an OLAP cube to execution of the query. In some implementations, the time may be reduced from on the order of days to on the order of seconds.

In some implementations, one component of the disclosed systems and methods is providing functionality for a user to specify a cube identifier in the request itself. Another component may be a schema-less tenant/instance which brings the cube definition file from a data-source at query time and then executes the query over the cube definition file. This may involve reducing the cube definition file creation time by not creating self-contained query language specific objects inside the cube definition file. In some implementations, additional latency due to cube definition file creation on the fly may be reduced by (1) cube definition file caching for reuse of cube definition files if the query comes again over the same cube, (2) prefetching cube definition files, where changes in OLAP cubes are scanned for changes and the in-memory cache of the cube is updated whenever a cube definition changes, and (3) a tenant owns the datascape schema provider instead of creating datascape schema provider every time at query time.

FIG. 1 is a block diagram of an example network architecture 100 for specifying an OLAP cube at query time. An architecture can include one or more database servers 110, user devices 130, and a network 140.

In some implementations, the user devices 130 may be used by a user to perform various actions and/or access various types of content, some of which may be provided over a network 140 (e.g, the Internet, LAN WAN, etc.). A "user" or "entity" used herein may refer to an individual operating user devices 130, interacting with resources or content items via the user devices 130, etc. The user devices 130 may be used to access websites (e.g., using an internet browser), media files, and/or any other types of content. An API (e.g., cube definition file API 204) may be configured to access content for display to users within resources (e.g., webpages, applications, etc.) and to provide content items to the user devices 130 over the network 140 for display within the resources. The content from which the API selects items may be provided by one or more database servers 110 via the network 140. In some implementations, one or more of the database servers can be at least a data catalog 208 and/or a schemaless database server 210.

Figure 2:
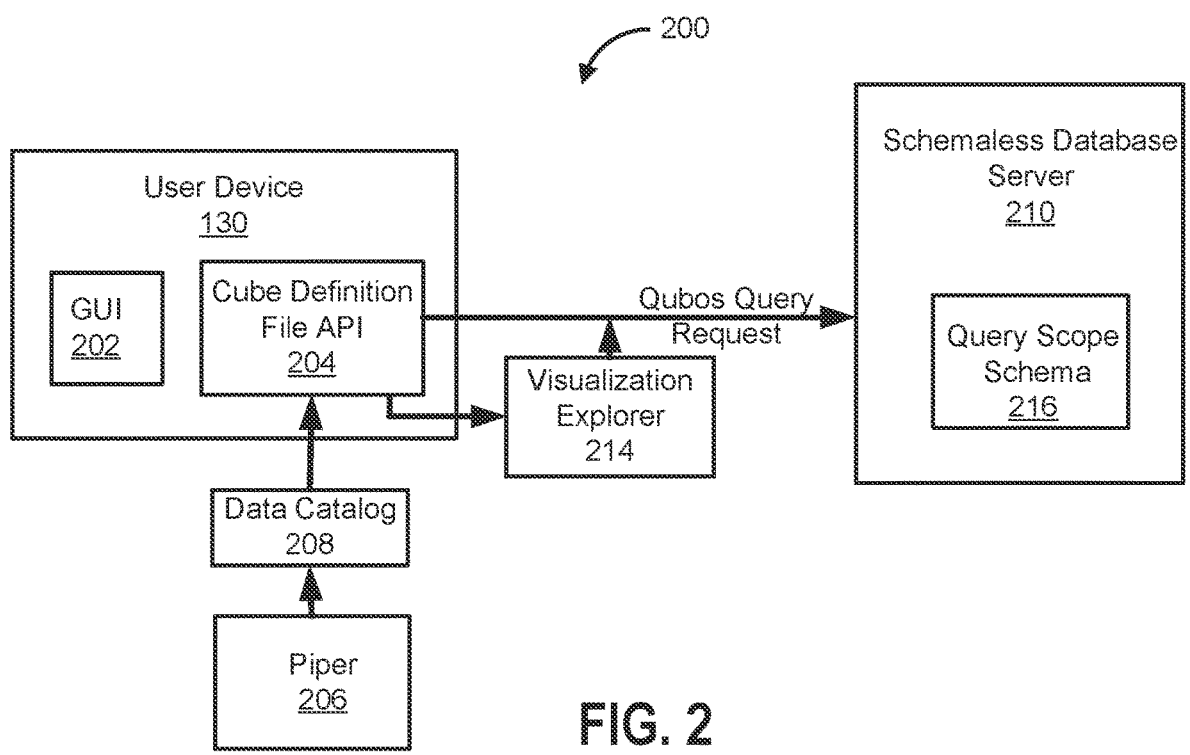
FIG. 2 is a block diagram of an example query system.

FIG. 2 is a block diagram of an example query system 200. In some implementations, the user device 130 can contain a graphical user interface (GUI) 202 and a cube definition file API 204. There may be data flow from piper 206 to data catalog 208 into the cube definition file API 204. There may be an OLAP cube query request from the cube definition file API 204 to the schemaless database server 210. The query request may also go through one or more of a visualization explorer 214. In some implementations, a drag and drop query interface may be used. The schemaless database server 210 can contain a query scope schema.

In some implementations, the user device 130 contains a GUI 202. The GUI can be configured to allow a user to create new dimensions and measures and then map them onto data-source columns.

In some implementations, the user device 130 contains a cube definition file API 204. The cube definition file API 204 may provide a shell to allow a user to set the cube definition file during a session. In some implementations, cube definition file creation time is reduced by not creating self-contained query language (e.g., RVL) specific objects inside the cube definition file. Further latency may be avoided by cube definition file caching and prefetching. Cube definition file caching may include storing a cube definition file to use if a query is received again over the same cube instead of recreating the cube definition file every time. A cube definition file prefetcher may scan for changes in OLAP cubes in data catalog 208. Whenever a cube definition changes, the cube definition file prefetcher can update the in-memory cache of the OLAP cube. A query specific field may be used to bypass the cache completely and access data catalog 208 directly to fetch cube definition file changes.

In some implementations, the example query system 200 includes a piper 206 (i.e., a version control system). The piper 206 can be used to modify a cube definition file and can validate a query against the modified schema. In some implementations, piper 206 can be used to search for an OLAP cube. In some implementations, were the OLAP cubes are indexed in data catalog 208, piper 206 accesses the index in data catalog 208. Schema in piper 206 may be synced to data catalog 208 for discovery. Schema in piper 206 may be synced to data catalog 208 for use in a schemaless database server 210.

In some implementations, the example query system 200 includes a data catalog 208. The data catalog 208 may index every OLAP cube where it can be searched and discovered. In some implementations, cube definition files may be stored in data catalog 208 where it is discoverable. In some implementations, data catalog 208 can be used to modify a cube definition file and can validate a query against the modified query. In some implementations, were the OLAP cubes are indexed in data catalog 208, piper 206 accesses the index in data catalog 208. Cube definition files in piper 206 may be synced to data catalog 208 for discovery.

In some implementations, the example query system 200 includes a visualization explorer 214. The visualization explorer 214 can serve a static dashboard or dynamic dashboard on top of an OLAP cube. In some implementations, visualization explorer 214 can be used as a service to generate an interactive report. A visualization explorer 214 instance may have to be set up and customized. In some implementations, the example query system 200 includes other visualization explorers. The visualization explorers may provide access to a data-source. In some implementations, visualization explorers can be used as a service to generate an interactive report.

In some implementations, the example query system 200 comprises a schemaless database server 210. The schemaless database server 210 may contain a query scope schema 216. The schemaless database server 210 may use schema (i.e., cube definition files) in piper 206 synced to data catalog 208. In some implementations, the schemaless database server 210 can run a request on an OLAP cube that is provided as part of the query request. The query scope schema 216 can be configured to use a reference to data catalog 208 in a query specifying what cube definition file to use. In some implementations, the example query system 200 uses an OLAP context container, wherein an OLAP context container is an object that is used during OLAP query execution to convert an OLAP query to an SQL query. The OLAP context container may contain mapping from an OLAP model to relational data sources. The OLAP context container may also contain various indexes to speed up an OLAP conversion request. In sonic implementations, the OLAP context container further comprises user-specified data to influence the heuristics used during the SQL generation. For example, user-specified data in the OLAP context container may determine that a cube schema preferentially selects one data source over another when a particular set of fields are requests.

Figure 3:
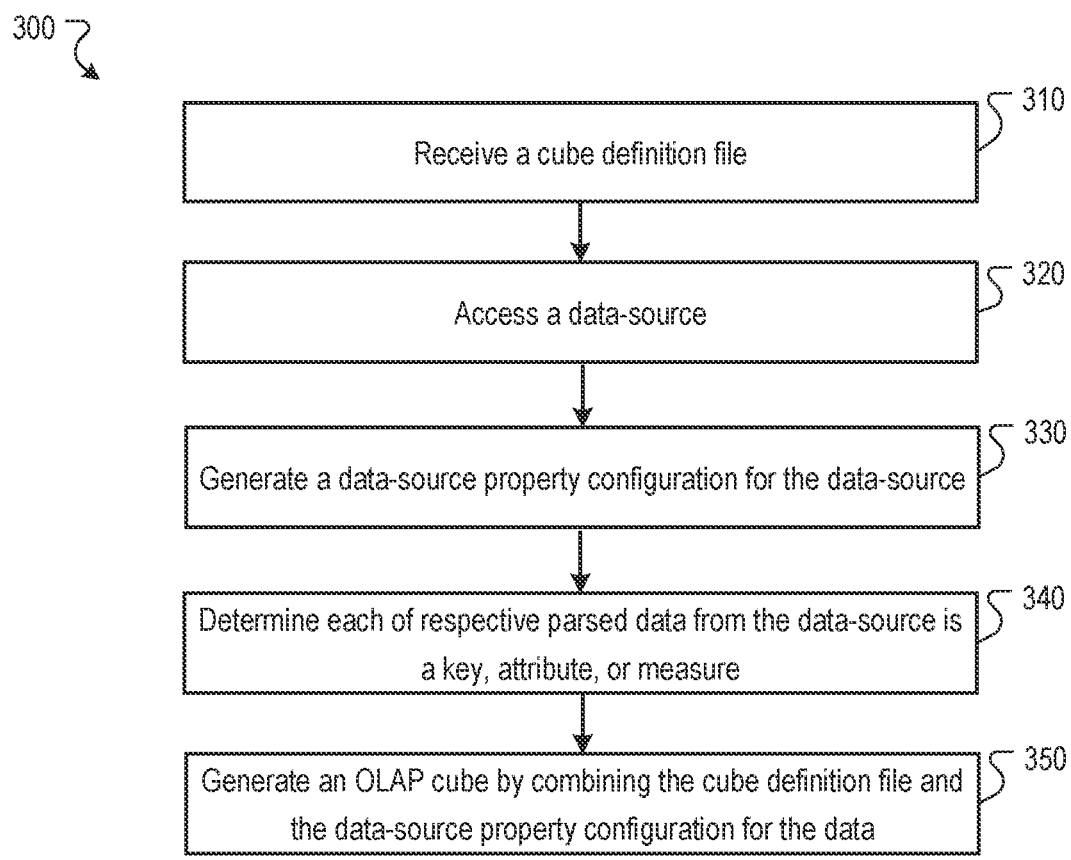
FIG. 3 is a flow chart of a method for generating an online analytical processing cube, in accordance with one or more implementations.

FIG. 3 illustrates a method 300 for generating an online analytical processing cube, in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting. In brief method 300 comprises receiving a cube definition file, accessing a data source, generating a data-source property configuration for the data source, determining each of the respective parsed data from the data source is a key, attribute, or measure, and generating an OLAP cube by combining the cube definition file and the data-source property configuration for the data.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices (e.g., database servers 110, schemaless database server 210, etc.) may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Still referring to FIG. 3 and in more detail, an operation 310 may include receiving a cube definition file. In some implementations, rather than requiring multiple cube definition files to create an OLAP cube, an OLAP cube can be created using a data-source (e.g., a non RVL data-source, wherein RVL or Relational View Language is a self-contained query language where RVL uses information in the schema to automatically aggregate data when columns are projected) with just a single cube definition file. For example, the cube definition file may be a cube_definition configuration file. In some implementations, this is a cube definition file for creation of an OLAP cube in "RVL_LESS" mode. The RVL_LESS mode may be hidden from the end user.

An operation 320 may include accessing a data-source. The data-source may not use relational view language. In some implementations, the data-source (e.g., data catalog 208) may index every OLAP cube where it can be searched and discovered. In some implementations, cube definition may be stored in the data-source where it is discoverable. In some implementations, the data-source can be used to modify a cube definition file and can validate a query against the modified query. In some implementations, were the OLAP cubes are indexed in the data-source, the data-source allows access to the index and may allow syncing for discovery.

An operation 330 may include generating a data-source property configuration for the data-source. In some implementations, generating a data-source property configuration for the data-source is done using the cube definition file. A data-source property configuration may comprise a list of data sources and keys, attributes, and/or measures contained respectively within.

An operation 340 may include determining each of respective parsed data from the data-source is a key, attribute, or measure. In some implementations, it is automatically determined if columns of relational data-sources are a key, an attribute, or a measure. Measure may be inferred from a default aggregation function in the cube definition. In some implementations, the user may be able to specify the overlay to indicate the key columns and other information. In some implementations, an overlay schema is provided to the user to allow the user to specify whether a column is a key or attribute. A key is a key attribute. In some implementations, each dimension in an OLAP cube contains a key attribute and the key attribute is the attribute in a dimension that identifies the columns in the dimension main table that are used in foreign key relationships to the fact table. The key attribute can represent the primary key column or column in the dimension table. A measure can be an aggregation of numeric data values. They can be a static element created at design time, or a calculated member based on other measures in the data structure by being summed, averaged, or otherwise mathematically manipulated. Attributes can be used to create foreign key relationships to dimension tables so that quantifiable data in the measure columns can be organized by the data contained in the dimension tables. Attributes can also be used to define the granularity of fact tables and corresponding measures.

An operation 350 may include generating the OLAP cube using the data-source property configuration and the determination of each of the respective parsed data from the data-source. In some implementations, the OLAP cube is generated using a single cube definition file using the data-source (e.g., a non RVL data-source). For example, the cube definition file may be a cube_definition configuration file. In some implementations, this is a cube definition file for creation of an OLAP cube in "RVL_LESS" mode. The RVL_LESS mode may be hidden from the end user.

Figure 4:
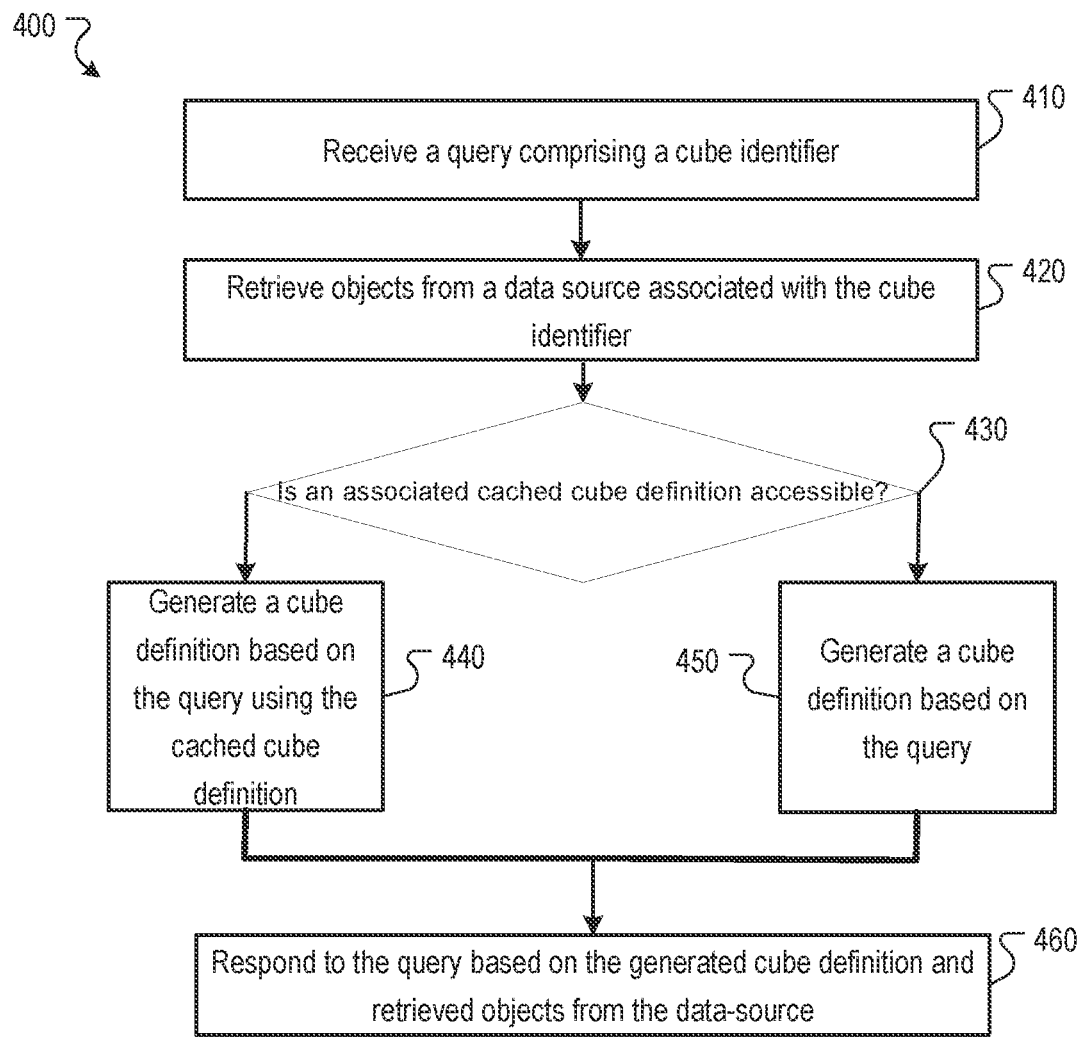
FIG. 4 is a flow chart of a method for operating a query system, in accordance with one or more implementations.

FIG. 4 illustrates a method 400 for operating a query system, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices (e.g., user devices 130, database servers 110, schemaless database server 210, etc.) may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 400.

An operation 410 may include receiving a query including a cube identifier. In some implementations, the cube identifier is specified in the query itself. In some implementations, the tenant can create the cube definition file specified in the cube associated with the cube identifier and build a query scope schema configuration to execute the query.

An operation 420 may include retrieving objects from a data source associated with the cube identifier. The objects may include cube definition files retrieved from the data source (e.g., data catalog 208).

An operation 430 may include determining if an associated cached cube definition file is accessible. Cube definition file caching may include storing a cube definition file to use if a query is received again over the same cube instead of recreating the cube definition file every time. A cube definition file prefetcher may scan for changes in MAP cubes in a data source (e.g., data catalog 208).

An operation 440 may include generating a cube definition file based on the query using the cached cube definition file. An operation 450 may include generating a cube definition file based on the query. In some implementations, the cube definition file is generated without using a cached cube definition file. The cube definition file may be a star schema. In some implementations, the cube definition file comprises dimensions and their attributes, simple measures and user-defined measures, mapping to columns form data sources, and prohibition rules (i.e., combinations of dimensions and measures that cannot be requested together), In some implementations, a public cube definition file may be generated from a checked-in cube definition file. The generation may include removing some details (e.g., data source mappings) that should not be visible to query users and adding data types from data sources.

An operation 460 may include responding to the query based on the generated cube definition file and retrieved objects from the data source.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN") e.g., the Internet.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A system configured for generating an online analytical processing (OLAP) cube, the system comprising:
   one or more processors configured by machine-readable instructions to:
      receive a query comprising a request for information from a data-source of a relational data warehouse;
      receive a cube definition file comprising a schema providing structured data organization of data in the data-source of;
      parse data of the data-source to automatically generate a data-source property configuration for the data-source by automatically determining if one or more values of the data-source correspond to a key, an attribute, or a measure;
      generate the OLAP cube based on the cube definition file and the data-source property configuration for the determined parsed data from the data-source; and
      respond to the query with the information from the data-source, the information obtained based on the generated OLAP cube.

2. The system of claim 1, wherein a plurality of data-sources are parsed, and wherein the one or more processers are further configured by machine-readable instructions to:
   generate a respective data-source property configuration for each of the plurality of data-sources; and
   generate the OLAP cube based on the cube definition file and the respective data-source property configuration for each of the plurality of data-sources.

3. The system of claim 1, wherein the one or more processors are further configured by machine-readable instructions to:
   determine a cube identifier based on the query;
   retrieve objects from the data-source, the data-source being associated with the cube identifier;
   generate an OLAP context container based on the cube identifier provided in the query, wherein the OLAP context container comprises a mapping between an OLAP model and the relational data warehouse; and
   respond to the query based on the generated OLAP context container and retrieved objects from the data-source.

4. The system of claim 3, wherein the cached OLAP context container is updated by scanning the data source associated with the cube identifier for changes and updating the cached OLAP context container whenever a cube definition of the data source has changed.

5. The system of claim 4, wherein the cached OLAP context container is stored in an in-memory cache of a cube, wherein the data source associated with the cube identifier comprises the cube.

6. The system of claim 3, wherein the data-source property configuration is generated at query time responsive to receiving the query.

7. A method of generating an online analytical processing cube, executing on a computing device, the method comprising:
   receiving a query comprising a request for information from a data-source of a relational data warehouse;

receiving a cube definition file comprising a schema providing structured data organization of data in the data-source;

parsing data of the data-source to automatically generate a data-source property configuration for the data-source by automatically determining if one or more values of the data-source correspond to a key, an attribute, or a measure;

generating the OLAP cube based on the cube definition file and the data-source property configuration for the determined parsed data from the data-source; and responding to the query with the information from the data-source, the information obtained based on the generated OLAP cube.

8. The method of claim 7, wherein a plurality of data-sources parsed, and wherein the method comprises:

using the cube definition file to generate a respective data-source property configuration for each of the plurality of data-sources, and generating the OLAP cube based on the cube definition file and the respective data-source property configuration for each of the plurality of data-sources.

9. The method of claim 7, comprising:
determining a cube identifier based on the query.

10. A non-transient computer-readable storage medium having instructions embodied thereon, the instructions being executable by one or more processors to perform a method for generating an online analytical processing (OLAP) cube, the method comprising:

receiving a query comprising a request for information from a data-source of a relational data warehouse;

receiving a cube definition file comprising a schema providing structured data organization of data in the data-source;

parsing data of a data-source to automatically generate a data-source property configuration for the data-source by automatically determining if one or more values of the data-source correspond to a key, an attribute, or a measure;

generating the OLAP cube based on the cube definition file and the data-source property configuration for the determined parsed data from the data-source; and responding to the query with the information from the data-source, the information obtained based on the generated OLAP cube.

11. The computer-readable storage medium of claim 10, wherein a plurality of data-sources are parsed, and wherein the method comprises:

using the cube definition file to generate a respective data-source property configuration for each of the plurality of data-sources, and generating the OLAP cube based on the cube definition and the respective data-source property configuration for each of the plurality of data-sources.

12. A system configured for operating a query system, the system comprising:

one or more processors configured by machine-readable instructions to:

receive a query comprising a request for information from a data-source of a relational data warehouse;

determine a cube identifier based on the query;

retrieve objects from the data-source, wherein the data-source is associated with the cube identifier;

automatically generate an OLAP context container based on the query, wherein the OLAP context container comprises a mapping between an OLAP model and the relational data warehouse; and respond to the query with the information from the data-source obtained based on the generated OLAP context container and retrieved objects from the data source.

13. The system of claim 12,
wherein the OLAP context container is generated by updating a cached OLAP context container;

wherein the cached OLAP context container is updated by scanning the data-source associated with the cube identifier for changes; and wherein the cached OLAP context container is updated by updating the OLAP context container whenever a cube definition of the data-source has changed.

14. The system of claim 13, wherein the cached OLAP context container is stored in an in-memory cache of a cube, wherein the data-source associated with the cube identifier comprises the cube.

15. A method of operating a query system comprising:
receiving a query comprising a request for information from a data-source of a relational data warehouse;

determining a cube identifier based on the query;

retrieving objects from the data-source, wherein the data-source is associated with the cube identifier;

automatically generating an OLAP context container based on the query, wherein the OLAP context container comprises a mapping between an OLAP model and the relational data warehouse; and responding to the query with the information from the data-source obtained based on the generated OLAP context container and retrieved objects from the data source.

16. The method of claim 15,
wherein the OLAP context container is generated by updating a cached OLAP context container;

wherein the cached OLAP context container is updated by scanning the data-source associated with the cube identifier for changes; and wherein the cached OLAP context container is updated by updating the cached OLAP context container whenever a cube definition of the data-source has changed.

17. The method of claim 16, wherein the cached OLAP context container is stored in an in-memory cache of a cube, wherein the data-source associated with the cube identifier comprises the cube.

18. A non-transient computer-readable storage medium having instructions embodied thereon, the instructions being executable by one or more processors to perform a method for operating a query system, the method comprising:

receiving a query comprising a request for information from a data-source of a relational data warehouse;

determining a cube identifier based on the query;

retrieving objects from the data-source, wherein the data source is associated with the cube identifier;

automatically generating an OLAP context container based on the query, wherein the OLAP context container comprises a mapping between an OLAP model and the relational data warehouse; and responding to the query with the information from the data-source obtained based on the generated OLAP context container and retrieved objects from the data-source.

19. The computer-readable storage medium of claim 18,
wherein the OLAP context container is generated by updating a cached OLAP context container;

wherein the cached OLAP context container is updated by scanning the data-source associated with the cube identifier for changes; and wherein the cached OLAP context container is updated by updating the cached OLAP context container whenever a cube definition of the data-source has changed.

20. The computer-readable storage medium of claim 19, wherein the cached OLAP context container is stored in an in-memory cache of a cube, wherein the data-source associated with the cube identifier comprises the cube.

* * * * *

UNITED STATES PATENT AND TRADEMARK OFFICE
CERTIFICATE OF CORRECTION

| | | |
|---|---|---|
| PATENT NO. | : 11,941,031 B2 | Page 1 of 1 |
| APPLICATION NO. | : 17/290543 | |
| DATED | : March 26, 2024 | |
| INVENTOR(S) | : Gudmundson et al. | |

It is certified that error appears in the above-identified patent and that said Letters Patent is hereby corrected as shown below:

In the Specification

Column 10, Line 18, after the word "data-source", please remove the word --of--

Signed and Sealed this
Twenty-second Day of April, 2025

Coke Morgan Stewart
*Acting Director of the United States Patent and Trademark Office*